L. M. GREIF.
PERMUTATION LOCK.
APPLICATION FILED JULY 14, 1916.

1,227,535.

Patented May 22, 1917.

WITNESS
Geo. E. Krieker

INVENTOR.
L. M. Greif.
BY Fisher & Moser
ATTORNEYS.

UNITED STATES PATENT OFFICE.

LOUIS M. GREIF, OF WEST PARK, OHIO.

PERMUTATION-LOCK.

1,227,535.

Specification of Letters Patent.   Patented May 22, 1917.

Application filed July 14, 1916.   Serial No. 109,242.

*To all whom it may concern:*

Be it known that I, LOUIS M. GREIF, a citizen of the United States, residing at West Park, in the county of Cuyahoga and State of Ohio, have invented certain new and useful Improvements in Permutation-Locks, of which the following is a specification.

This invention consists in a permutation lock and is designed to provide an attachment for bolts generally which are adapted to be pushed in or out by hand and used for doors, gates, windows, drawers and the like and, in fact, for slidable parts adapted to serve equivalent purposes, such as to cover a key-hole or the like to prevent the insertion of a key or other device, all substantially as shown and described and particularly pointed out in the claims.

Figure 1:
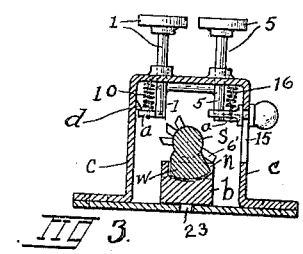
Figure 2:
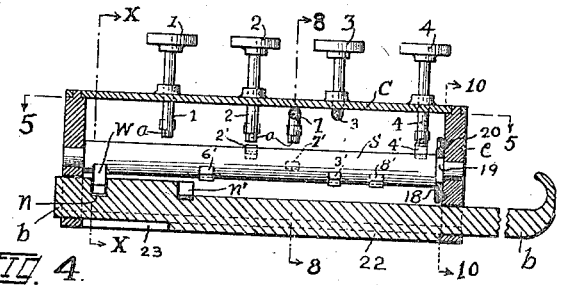
Figure 3:
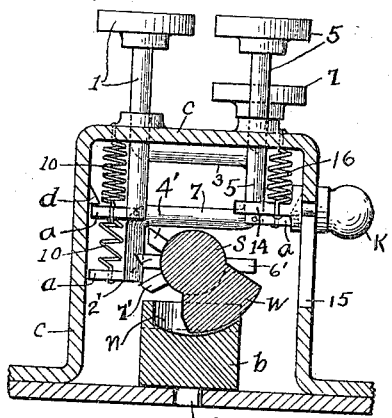

In the accompanying drawings, Figures 1, 3, 6 and 7 are cross sections of the bolt and the locking attachment therefor on line $x-x$, Fig. 2, but Fig. 3 is enlarged as compared with the other three views and the actuating parts in said several views are in different positions as hereinafter described.

Figures 4, 5:
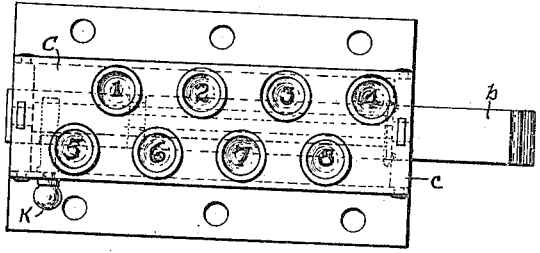
Figures 8, 10:
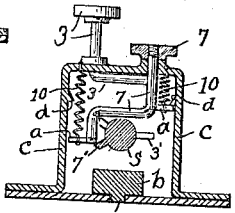
Figure 9:
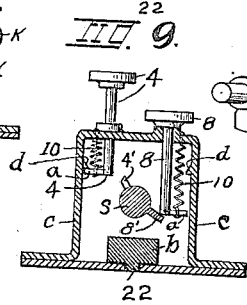
Figure 11:
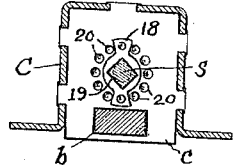

Fig. 2 is a longitudinal sectional elevation of the bolt and locking attachment. Fig. 4 is a plane view looking down on Fig. 2, and Fig. 5 is a section view on horizontal line 5—5, Fig. 2, the top and the push buttons being removed. Fig. 8 is a cross section on line 8—8, Fig. 2. Fig. 9 is a cross section on line 9—9, Fig. 5. Fig. 10 is a cross section on line 10—10, Fig. 2, showing the friction lock for the rotatable shaft, and Fig. 11 is a perspective view of said shaft.

As thus shown and described $b$ represents a bolt, adapted to slide lengthwise into and out of locking engagement more or less as usual with such bolts of a common type, but supported in this instance in the ends of a casing $c$ and slidable within limits in the bottom of the casing as will presently be seen.

The plan of the invention contemplates means to lock the bolt in open or closed position, and the said means furthermore are such as involve the actuation of several parts progressively but which are exactly similar to other like parts that are negatives, and all said parts are in series and not distinguishable one from the other by exterior appearance like a key board on a typewriter so that a person who may desire to tamper with the lock and is not in the secret as to which push members are active and which negative could not possibly open or close the bolt except by a mere chance, if at all, thus making a lock which may be said to be burglar proof so far as opening of it is concerned by unauthorized persons.

To these ends I mount a shaft $s$ in the casing $c$ lengthwise over the bolt $b$ with bearings in the ends of said casing, and associated with the said bolt are eight different key members having buttons and stems and numbered progressively 1, 2, 3, 4, 5, 6, 7 and 8, and in two rows with four in each row. The stems of said members are slidably mounted in the top of casing $c$ and the same number designates the button and its stem in each case. Retracting springs 10 restore all said push or key members, or stems and buttons, to raised position after each individual depression.

The shaft $s$ is rotatable under the action of any one of the active or positive push members, and the present construction and arrangement contemplates three of these, or 7, 2 and 4, as in the order herein designated, while the other five members are designated as reversing keys or dummies because they not only lend to the confusion of a meddler but in this construction Nos. 1 and 5 are actual dummies or blinds, while 3, 6 and 8 actually turn the shaft reversely or against the direction which will liberate the bolt.

It will be seen that bolt $b$ has two transverse recesses or notches $n$ and $n'$, and that shaft $s$ has a segmentally shaped wing or projection $w$ adapted to engage in either of said slots according as the bolt is in or out, and normally said wing is in one or the other recess or notch. The said shaft also has a series of scattered outwardly projecting lugs here and there which are designated in this instance by 2', 3', 4', 6', 7' and 8' corresponding with the several key members 2, 3, 4, 6, 7, and 8, respectively, and adapted to be engaged thereby when said members are depressed.

The said lugs are, therefore, in staggered relations on oppositie sides of said shaft, and the positive lugs 7', 2' and 4' are arranged successively in the relation seen in Fig. 3 and beveled at their ends, and the several positive push members 7, 2 and 4 are adapted to depress these lugs successively and rotate the shaft a third way each to turn its wing $w$ out of the slot in the bolt and thus release the bolt for movement.

Figure 6:
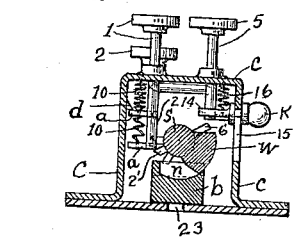
Figure 7:
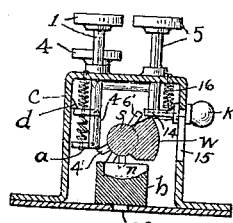

In Fig. 3 it will be seen that stem 7 is bent twice at right angles to bring it across to the opposite side as a positive member with 2 and 4, and is first in the order of operation, as seen in Fig. 3, while Fig. 6 shows the push member 2 as completing its down stroke. Fig. 7 shows member 4 depressed and the wing w clear of the bolt. When out the wing w is thrown back into slot n and the bolt locked by means of the knob k and stem 14 thereon and adapted to bear on said wing and throw it back into locking position by depressing said knob and stem in the slot 15 in the casing. Said stem and knob are then restored to normal or raised position by the spring 16, Fig. 6.

When the wing w is cleared of the bolt, as in Fig. 7, the reversing lugs 3', 6' and 8' are rotated far enough around upward to be out of range of the corresponding key members 3, 6 and 8, Fig. 7, and the knob k and its stem then serve to bring the wing w into locking relations with the bolt. In fact a good plan in any case is to first depress said knob to make sure that the parts are in full locked relations and then the predetermined combination will work as planned even if some disarrangement has come through efforts to open the lock or from other cause. Thus it will be seen that there are three positive or unlocking keys and three reversing or locking keys and two actual dummies, and each of the positive keys and the reversing keys effects a one-third opening or closing movement of the wing w.

To avoid any tendency in shaft s to rotate further than purposely turned I provide a friction brake or check consisting of a collar 18 fixed on a square shank 19 thereon and having teats or rounded projections adapted to engage in the depressions 20 in the end of the casing disposed in a circle about said shaft.

The bolt b is adapted to have a limited thrust movement in casing c and to this end has a rib 22 which runs in a slot 23 in the bottom of the casing.

The arrangement of the respective positive and reversing keys or key members shown and described is not arbitrary and no two locking devices need necessarily be alike. In fact an infinite number of combinations are possible, as in permutation locks, and any two or three or more of said key members may be positive and the others reversing or dummies. Any one or more keys may also be crossed from side to side as in the case of member 7.

Each key stem has a lateral projection a with which the spring 10 therefor is engaged to raise the key after a depression and a stop d limits the upward movement.

What I claim is:

1. A bolt locking mechanism as described comprising a casing and a slidable bolt therein, a shaft provided with a wing adapted to make locking engagement with said bolt, and a series of depressible individual key members in said casing, said shaft having lateral projections adapted to be engaged by said key members and to rotate said shaft in one direction or the other according to their position in the casing.

2. A device as described comprising a casing and a bolt slidable within limits therein, a shaft rotatably mounted in said casing above said bolt and provided with a wing adapted to engage the bolt at different points and lock the same against movement, and means to rotate said shaft in a step-by-step movement in opposite directions.

3. A bolt locking device comprising a casing and a slidable bolt therein having shouldered recesses in its top and a shaft having a wing adapted to engage in said recesses and a plurality of lateral projections between its ends, in combination with a plurality of depressible key members mounted in said casing relatively on opposite sides of said shaft and adapted to engage said projections and rotate said shaft limited distances to one side or the other according to their location.

4. A slidable bolt and a casing therefor, a rotatable shaft in said casing over the said bolt provided with a wing adapted to engage and lock the bolt and having a series of scattered projections between its ends, and depressible key members provided with stems extending into said casing on opposite sides of said shaft and adapted each to engage one of said projections and rotate the shaft according to the position thereof in the casing.

5. A casing and a slidable bolt therein having a plurality of recesses in its top, a rotatable shaft in said casing over said bolt and having a wing adapted to engage in said recesses, means to rotate said shaft in a step-by-step operation, and a collar fixed on the said shaft and constructed to make frictional engagement with the inside of said casing and hold the shaft to exact rotations.

In testimony whereof I affix my signature in presence of two witnesses.

LOUIS M. GREIF.

Witnesses:
GEO. E. KRICKER,
F. C. HARROLD.

Copies of this patent may be obtained for five cents each, by addressing the "Commissioner of Patents, Washington, D. C."